Jan. 17, 1928.  1,656,738
J. B. KINGDON
PLUCKING MACHINE
Filed March 10, 1927  8 Sheets-Sheet 1
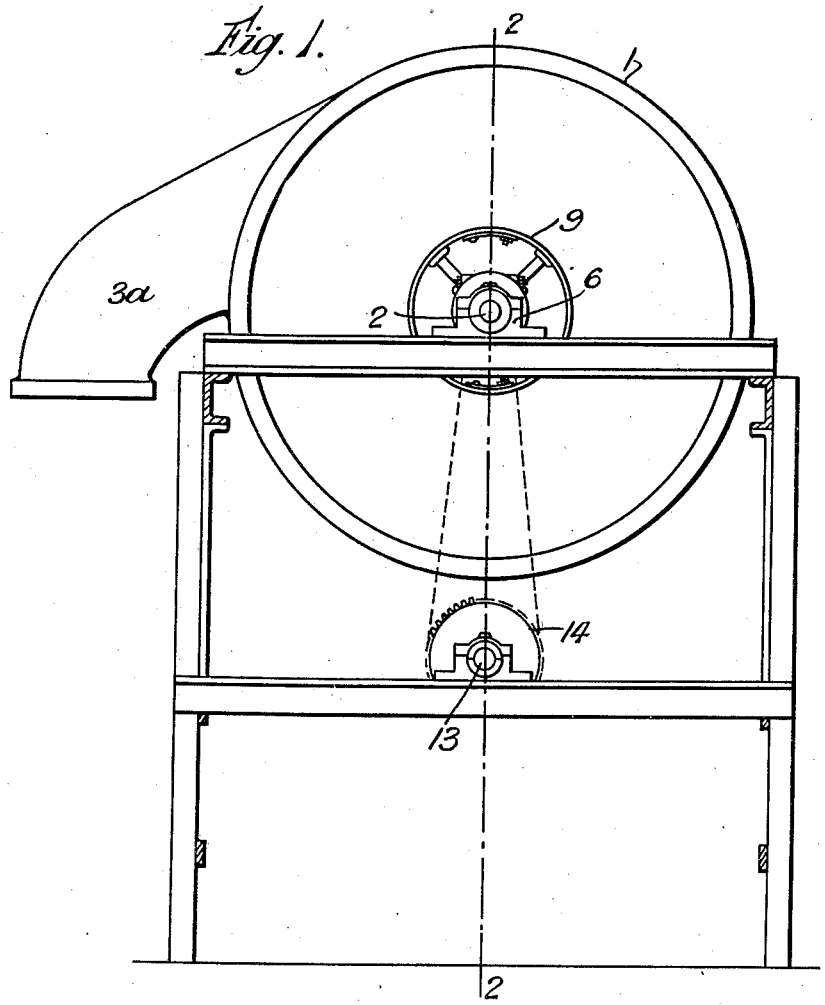

Jan. 17, 1928.　　　　　　　　　　　　　　　　　1,656,738
J. B. KINGDON
PLUCKING MACHINE
Filed March 10, 1927　　　　8 Sheets-Sheet 2
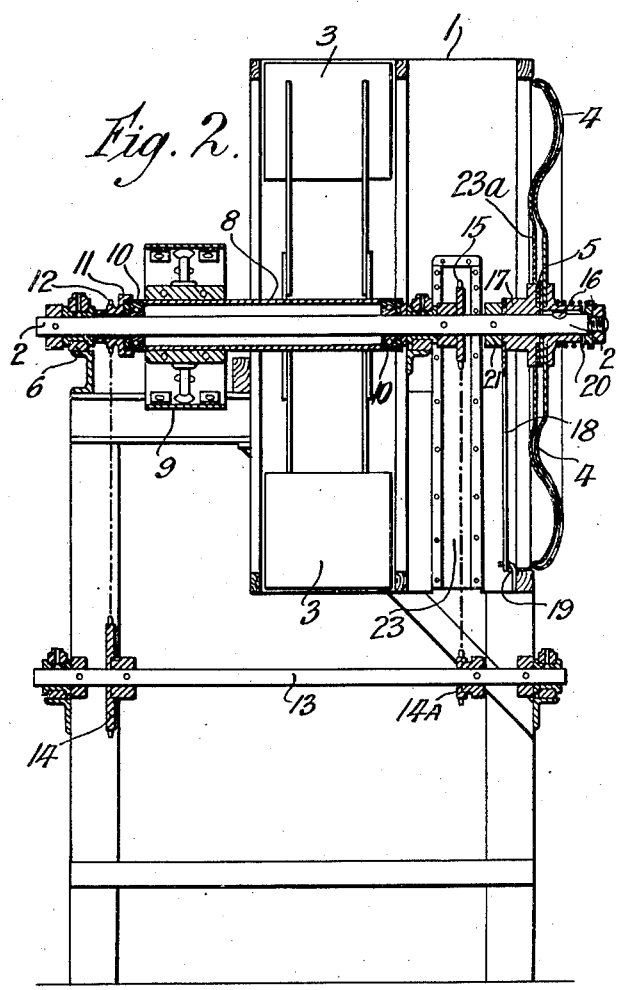

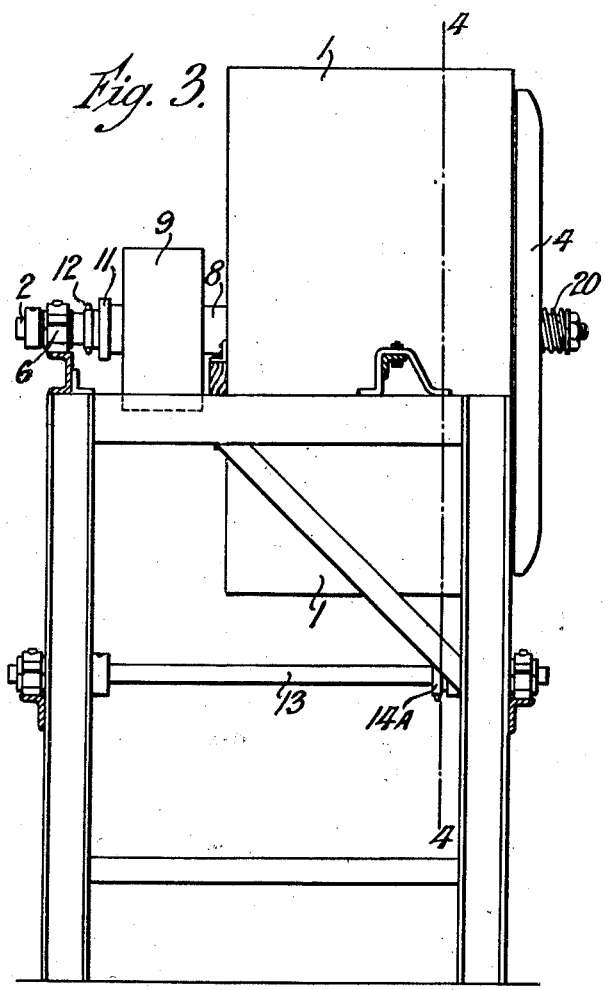

Jan. 17, 1928.
J. B. KINGDON
1,656,738
PLUCKING MACHINE
Filed March 10, 1927 8 Sheets-Sheet 4
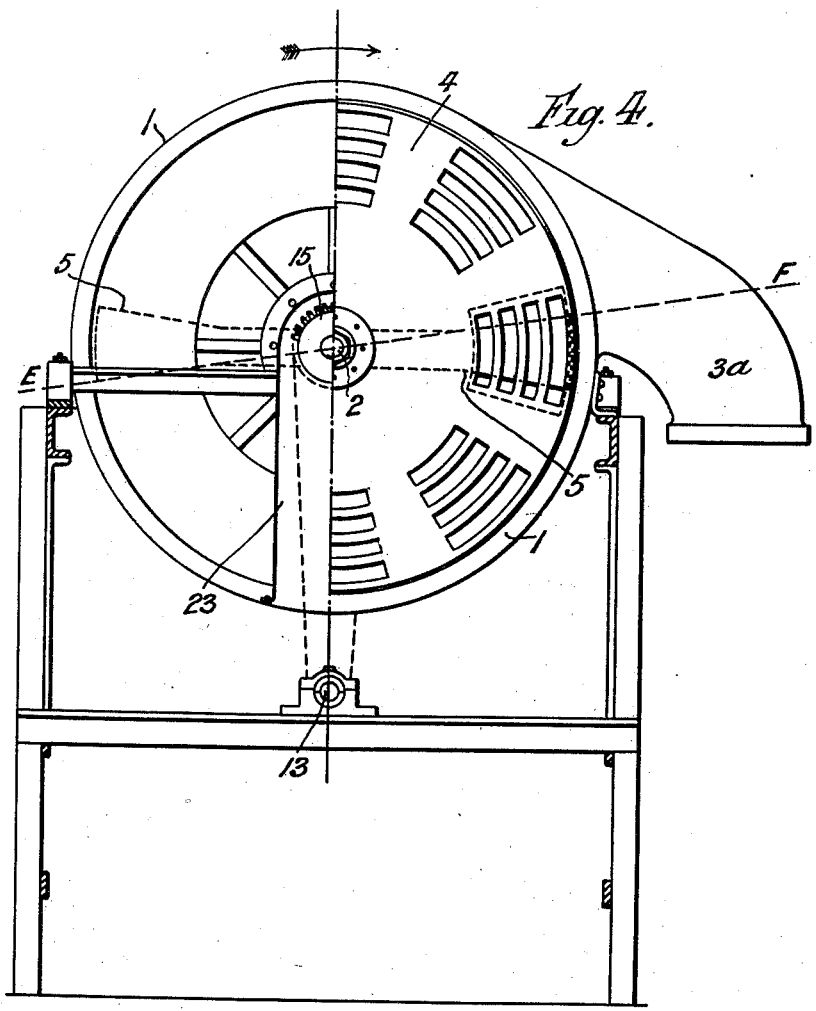

Jan. 17, 1928.
J. B. KINGDON
1,656,738
PLUCKING MACHINE
Filed March 10, 1927     8 Sheets-Sheet 5
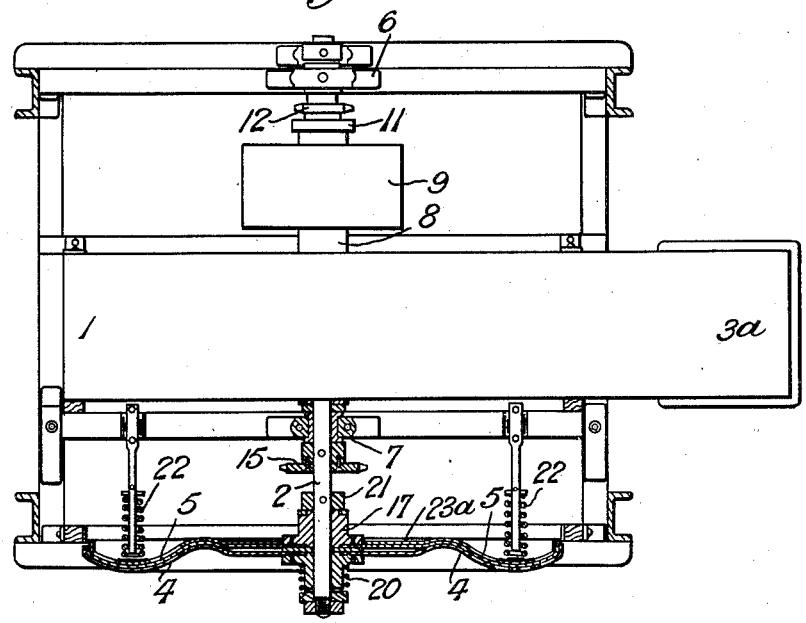
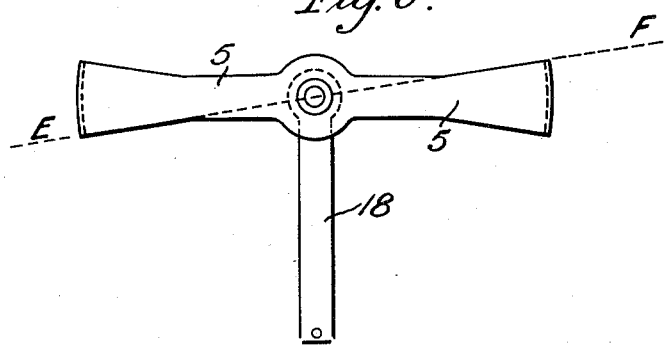
Inventor
John B. Kingdon
By his Attorneys Jan. 17, 1928.  
J. B. KINGDON  
PLUCKING MACHINE  
Filed March 10, 1927  
1,656,738  
8 Sheets-Sheet 6
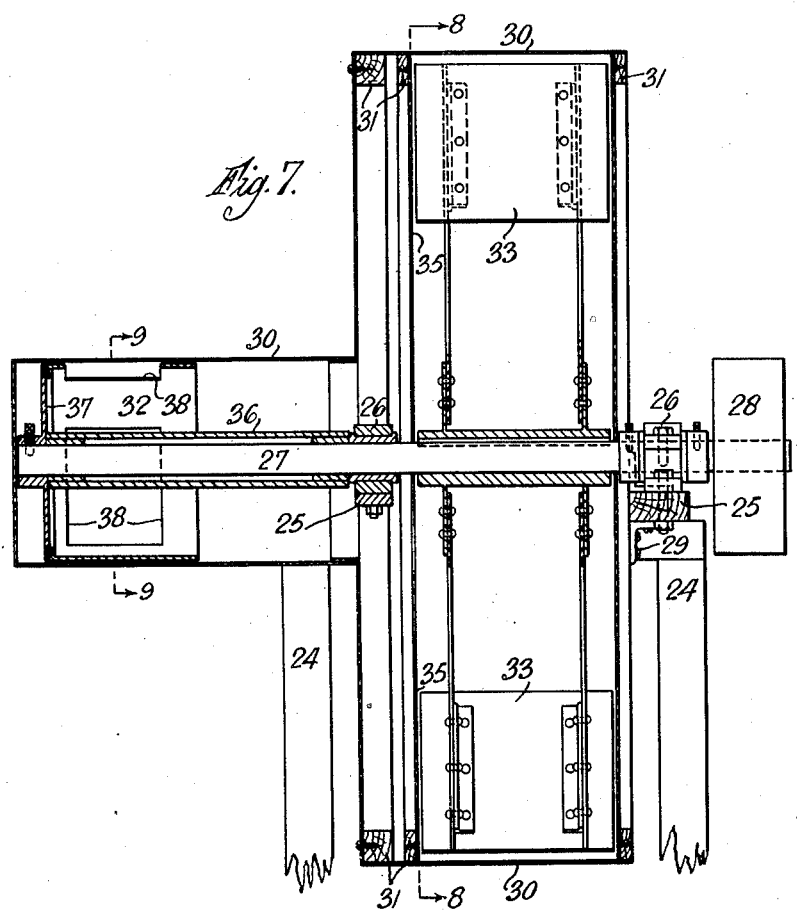

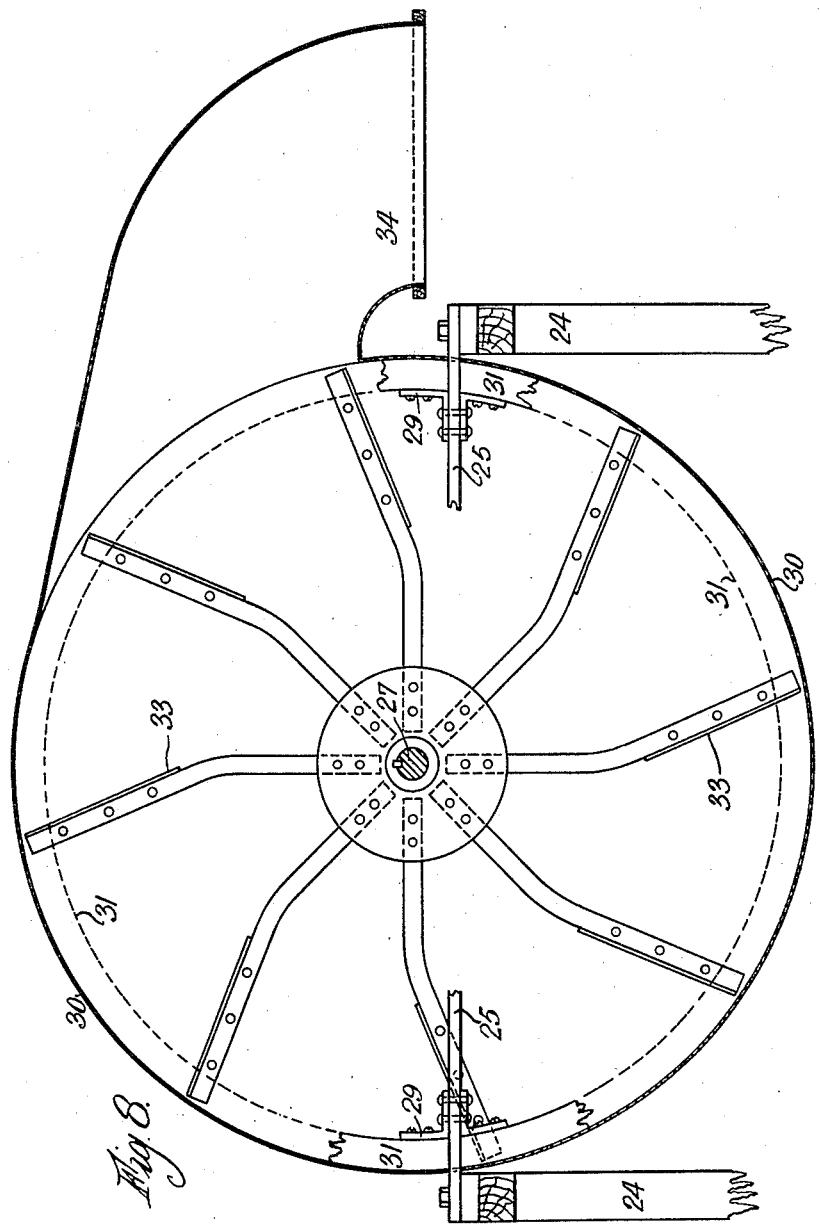

Jan. 17, 1928.
J. B. KINGDON
PLUCKING MACHINE
Filed March 10, 1927       8 Sheets-Sheet 8
1,656,738
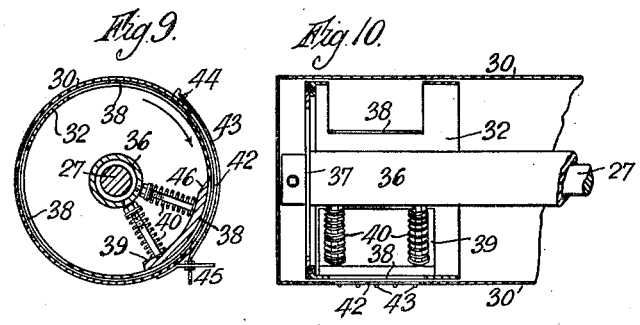
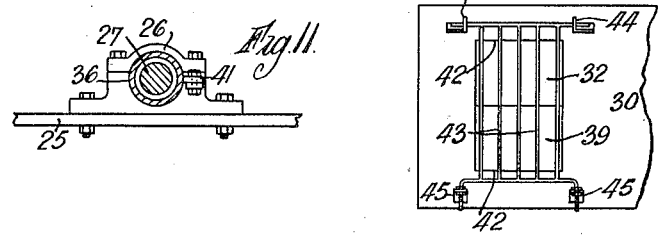
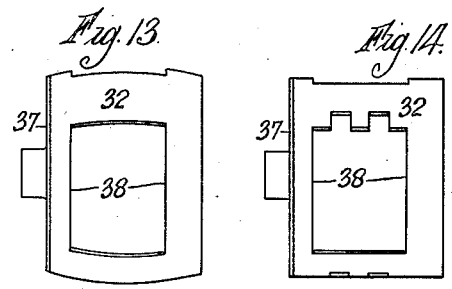
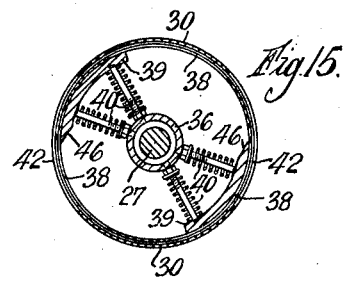
Inventor
John B. Kingdon
By His Attorneys
Buedwin Wight Patented Jan. 17, 1928.

1,656,738

UNITED STATES PATENT OFFICE.

JOHN BANNATYNE KINGDON, OF STOCKBRIDGE, ENGLAND.

PLUCKING MACHINE.

Application filed March 10, 1927, Serial No. 174,228, and in Great Britain March 22, 1926.

This invention relates to a machine for plucking feathers from birds and consists essentially in a rotating body provided with slots or holes close behind which is another body. The edge of this second body co-operates with the edges of the openings in the first to seize and pluck out the feathers from the body of a bird presented to the openings by the operator. The feathers are carried away by a fan. The rotating body may be of any suitable form, but preferably it is either disk or drum shaped. In the former case the co-operating body may take the form of a sector or of another disk. In the latter case the co-operating body may be curved to the shape of the revolving body.

The foregoing, and other features of the invention will be better understood from the following description of suitable embodiments of the invention. Reference is made to the accompanying drawings in which Figure 1 is a rear elevation and Figure 2 a section on the line 2—2 of Figure 1 showing the general layout of a machine in which the rotating body is disk-shaped; Figure 3 is a side elevation and Figure 4 a front elevation of the operating end of the machine showing one half of the casing cut away on line 4—4, Figure 3; Figure 5 is a plan, but with the front part of the casing in cross section, showing the general arrangement of the disk sector member, and Figure 6 is a front elevation of the sector member. Figure 7 is a sectional elevation of an embodiment of the invention in which the rotating body is drum-shaped; Fig. 8 is a cross-section through the line 8—8 of Fig. 7; Fig. 9 is a cross-section along the line 9—9 of Fig. 7; Fig. 10 is a part sectional plan of the drum and parts adjacent to it; Figures 11 and 12 are detail views; Figures 13 and 14 show modified forms of drum, and Figure 15 is a view corresponding to Figure 9 of another modification.

The machine comprises a thin sheet metal casing or cylinder 1 which has a shaft 2 running through the centre. On this shaft at one end of the casing is mounted a sleeve carrying a suitable rotary blower 3 having a discharge channel 3ª and at the other end a disk 4 with concentric slots arranged in radial groups, and a sector member 5. The disk is formed with concentric concave and convex channels as shown to accommodate the body of the bird. The main shaft 2 is carried in two bearings 6 and 7 which are in turn mounted on cross members of the frame.

The blades of the blower, as shown in Figure 2, are mounted on a hollow sleeve 8 which extends through the closed end of the casing and carries a belt pulley 9 preferably of the split type as shown. This sleeve is carried on the main shaft by two ball races 10 which allow it to revolve independently of the shaft. A collar 11 and chain sprocket 12 are screwed or attached by other means to the sleeve. The sprocket 12 drives a countershaft 13 by means of the driven sprocket 14. At the other end of the countershaft 13 is another sprocket 14ᴬ which in turn drives the main shaft 2 by means of the driven sprocket 15 which is attached thereto.

The slotted disk 4 is splined to the shaft 2 by a key 16. The sector member 5 consists of two sectors arranged diametrally as shown and is mounted on a hub 17. It is shaped to fit against the disk and is prevented from revolving by means of arm 18 and stop 19. The disk 4 is spring loaded so as to press against the sector member by a spring 20 and the thrust is taken by a collar 21.

In the case of a thin metal sector member as shown, it is necessary to have springs 22, Figure 5, to keep the sectors in close contact with the disk.

A chain case 23 is fitted to make the casing as airtight as possible, and a suitable baffle-plate 23ª is fitted between the slotted disk and the blower so as to cover the holes in the disk which are not engaged in the plucking operation and thus to concentrate the suction of air at the point where the sectors are in contact with the disk.

Figure 4 shows a preferred arrangement of the slots in the disk 4, and the leading edges of the sectors are indicated by the dotted line E F. It will be seen that the two live spots on the face of the disk occur at the points where the slots intersect the line E F. The direction of rotation is indicated by the arrow, Figure 4.

The bird to be plucked is held by the operator lightly against the slots of the revolving disk on a line with the leading edge of the segment behind and moved about to expose all the feathers to the disk. By the action of the current of air caused by the blower and the fact that by holding the bird in the correct position the feathers tend to be rubbed in the opposite direction to which they grow, they are drawn into the slots and caught between the revolving disk and the stationary sector member which plucks them from the bird. As soon as the feathers are free they are drawn into the blower and driven through the outlet into a bag attached thereto.

By making the sector member double ended, as in this particular form of the invention, it is possible to pluck two birds at once, as there is a leading edge on each sector making two live spots on the face of the revolving disk.

The disk may be a flat plate, but is much more efficient if made in the form shown in the drawings, or in any other form giving a suitable concavity and convexity axially to the shaft.

The sector member may be of thin sheet metal as shown, or of wood, fibre or other suitable material if made of a sufficient thickness.

The modification shown in Figures 7 to 15 will now be described.

Mounted on a stand 24 are two cross bars 25 which carry bearings 26 for a main shaft 27 which is driven by a pulley 28. The cross bars also support by means of brackets 29 a casing 30 which is formed mainly of sheet material such as sheet metal, strengthened by rings 31 preferably made of bent wood. The casing comprises two compartments, a smaller one shown on the left of Figure 7 containing a drum 32 and the larger on the right a fan 33. The fan compartment is provided with a delivery branch 34 and is fitted internally with an annular partition 35 which covers the fan blades.

The drum 32 which is made chiefly of metal, surrounds the main shaft, and is secured thereto by a plate 37, and is provided with a number of rectangular openings 38 spaced at equal intervals round its circumference. A suitable diameter for the drum is about 8 inches. Within the drum and substantially in contact with it is a member 39 forming part of a curved cylinder of approximately the same curvature as the drum. The member 39 is mounted on a sleeve 36 by adjustable resilient arms 40 and the sleeve and therefore the member 39 are held fixed by a lug 41 on the sleeve clamped to the left hand bearing 26 as shown in Figure 11.

The casing is cut away at one side as shown at 42 so as to leave an opening of approximately the size of one of the openings 38 in the drum, but slightly narrower, and this opening is covered by a grid 43 pivoted in brackets 44 on the casing and adapted to be clamped to other brackets 45 also on the casing so that its distance from the drum can be adjusted according to the size of the feathers which are to be removed. The drum turns in the direction of the arrow in Figure 9, and the edge 46 of the member 39 is chamfered as shown so as to grip between itself and the edges of the openings in the drum the feathers of a bird held against the grid and pluck them out. The feathers are caused to stand out from the body of the bird by the air current, and after plucking are drawn inwards and discharged through the delivery branch 34. The grid serves as a guard to protect the hands of the operator and the flesh of the bird.

The above described apparatus is given by way of example only, the essential feature being the drum shaped formation of the rotating body which grasps the feathers. Figure 13 shows a form in which the drum is barrel-shaped and Figure 14 shows a cylindrical drum in which the operating edges of the openings 38 are castillated. The result of this formation is that the entire operating edge of the hole is not in action at the same time, and less pull is exerted on the body of the bird.

Fig. 15 is a view corresponding to Fig. 9 showing two fixed members 39 diametrically disposed with respect to the drum so that two operators can use the same machine at the same time. The casing is provided with two openings corresponding to the two fixed members.

What I claim is:—

1. A machine for plucking feathers from birds comprising a rotating body having openings therein, and a non-rotating member adjacent to the said body adapted to co-operate with the openings to grasp and pluck out the feathers.

2. In a plucking machine as claimed in claim 1, a blower adapted to draw air in through the said openings.

3. In a plucking machine as claimed in claim 1, a blower adapted to draw air in through the said openings and means for covering all the openings in the body not engaged in the plucking operation.

4. A machine for plucking feathers from birds comprising a hollow rotating drum having openings therein and a member adjacent to the interior of the said drum adapted to co-operate with the openings to grasp and pluck out the feathers.

5. In a plucking machine as claimed in claim 4, a blower adapted to raise the feathers from the body of the bird and to remove them.

6. In a plucking machine as claimed in claim 4, a blower adapted to raise the feathers from the body of the bird and to remove them, and means for covering all the openings in the drum not engaged in the plucking operation.

7. A machine for plucking feathers from birds, a casing, a blower within the casing, a hollow rotating drum also within the casing, openings in the drum, a fixed member adjacent to the interior of the drum and adapted to co-operate with the said openings to grasp and pluck out the feathers, and an opening in the casing substantially equal in area to that of any one of the openings in the drum and adapted to register with the said openings in turn as the drum rotates.

8. In a plucking machine as claimed in claim 7, a driving shaft common to the blower and the rotating drum, a sleeve mounted on the said shaft, means for fixing the sleeve, and resilient means for supporting the said fixed member on the sleeve.

9. In a plucking machine as claimed in claim 7, an adjustable grid covering the opening in the casing adapted to protect the hands of the operator and the flesh of the bird.

10. In a plucking machine as claimed in claim 7, an adjustable grid covering the opening in the casing adapted to protect the hands of the operator and the flesh of the bird, a driving shaft common to the blower and the rotating drum, a sleeve mounted on the said shaft, means for fixing the sleeve, and resilient means for supporting the said fixed member on the sleeve.

11. In a plucking machine as claimed in claim 7, a driving shaft common to the blower and the rotating drum, a sleeve mounted on the said shaft, means for fixing the sleeve, and resilient adjustable means for supporting the said fixed member on the sleeve.

In testimony that I claim the foregoing as my invention I have signed my name this 26th day of February, 1927.

JOHN BANNATYNE KINGDON.